United States Patent
Shu et al.

(10) Patent No.: US 11,868,505 B2
(45) Date of Patent: Jan. 9, 2024

(54) AUTOMATIC SELF-REMOVAL OF SENSITIVE DATA ITEMS

(71) Applicant: salesforce.com, inc., San Francisco, CA (US)

(72) Inventors: Gang Shu, South San Francisco, CA (US); Jong Lee, Pleasanton, CA (US); Kasthuri Periyakoil, Campbell, CA (US); Shawn Butterfield, Pitt Meadows (CA); Gerard Iervolino, Hoboken, NJ (US); Mike Cain, Austin, TX (US); Kevin Lun, Bellevue, WA (US); Sriram Rangaraj, Sunnyvale, CA (US); Sai Lakshminaraayana, San Francisco, CA (US); Jianwu Zhao, Redmond, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/477,236

(22) Filed: Sep. 16, 2021

(65) Prior Publication Data
US 2023/0084198 A1    Mar. 16, 2023

(51) Int. Cl.
    *G06F 3/0482*     (2013.01)
    *G06F 21/62*     (2013.01)
    *G06F 9/451*     (2018.01)

(52) U.S. Cl.
    CPC ........ *G06F 21/6245* (2013.01); *G06F 3/0482* (2013.01); *G06F 9/451* (2018.02)

(58) Field of Classification Search
CPC ..... G06F 21/6245; G06F 9/451; G06F 3/0482
See application file for complete search history.

(56) References Cited

U.S. PATENT DOCUMENTS

| | | | |
|---|---|---|---|
| 11,263,335 B2* | 3/2022 | Parthasarathy | ... G06F 16/24578 |
| 11,328,093 B1* | 5/2022 | Galvin, Jr. | .......... G06F 21/6254 |
| 2014/0289875 A1* | 9/2014 | Knafel | ................ G06F 21/6245 726/33 |
| 2017/0279752 A1* | 9/2017 | Pierce | .................... H04L 51/212 |
| 2018/0253440 A1* | 9/2018 | Levesque | .............. G06F 16/162 |
| 2019/0278940 A1* | 9/2019 | Huang | .................... G06F 21/83 |
| 2020/0311304 A1* | 10/2020 | Parthasarathy | ..... G06F 11/3006 |
| 2020/0372172 A1* | 11/2020 | Murray | ............... G06F 16/9024 |
| 2020/0410116 A1* | 12/2020 | Williamson | ........ G06F 21/6254 |
| 2022/0245276 A1* | 8/2022 | Gupta | ................. G06F 21/6245 |
| 2022/0245283 A1* | 8/2022 | Springer | ............. G06F 21/6245 |

(Continued)

*Primary Examiner* — Anil K Bhargava
(74) *Attorney, Agent, or Firm* — Sterne, Kessler, Goldstein & Fox P.L.L.C.

(57) ABSTRACT

System, method, and/or computer program product embodiments for automatic removal of sensitive data items from records are disclosed. In one or more embodiments, a record with a sensitive field (for storing a sensitive data item) is linked to a self-removal data policy that includes a condition set. When the condition set is true, the sensitive data item is automatically removed from the record without deleting the record and without removing other data items stored in other fields of the record. Conditions may be associated with a time period following the upload or storage of the sensitive date item, the occurrence of an event that requires the sensitive date item, a read or approval of the sensitive data item, etc. A user may modify a condition in the condition set to make the condition more stringent or less stringent.

20 Claims, 5 Drawing Sheets

(56) References Cited

U.S. PATENT DOCUMENTS

2022/0292204 A1* 9/2022 Bang .................. G06F 21/6245
2023/0222155 A1* 7/2023 Ouimet ................. G06N 3/045
　　　　　　　　　　　　　　　　　　　　　707/769

* cited by examiner

AUTOMATIC SELF-REMOVAL OF SENSITIVE DATA ITEMS

BACKGROUND

Security breaches in which sensitive data items are accessed and/or stolen are becoming increasingly common. Accordingly, it is no surprise that users are hesitant to upload their sensitive data items to an online entity. Users would like some guarantee that their uploaded sensitive data items will be deleted as soon as possible and/or would like some control as to how long an online entity will store the sensitive data items.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method, and/or computer program product embodiments for automatic removal of sensitive data items from records. In one or more embodiments, a record with a sensitive field (for storing a sensitive data item) is linked to a self-removal data policy that includes a condition set. When the condition set is true, the sensitive data item is automatically removed from the record without deleting the record and without removing other data items stored in other fields of the record. Conditions may be associated with a time period following the upload or storage of the sensitive date item, the occurrence of an event that requires the sensitive date item, a read or approval of the sensitive data item, etc. A user may modify a condition in the condition set to make the condition more stringent or less stringent.

Figure 1:
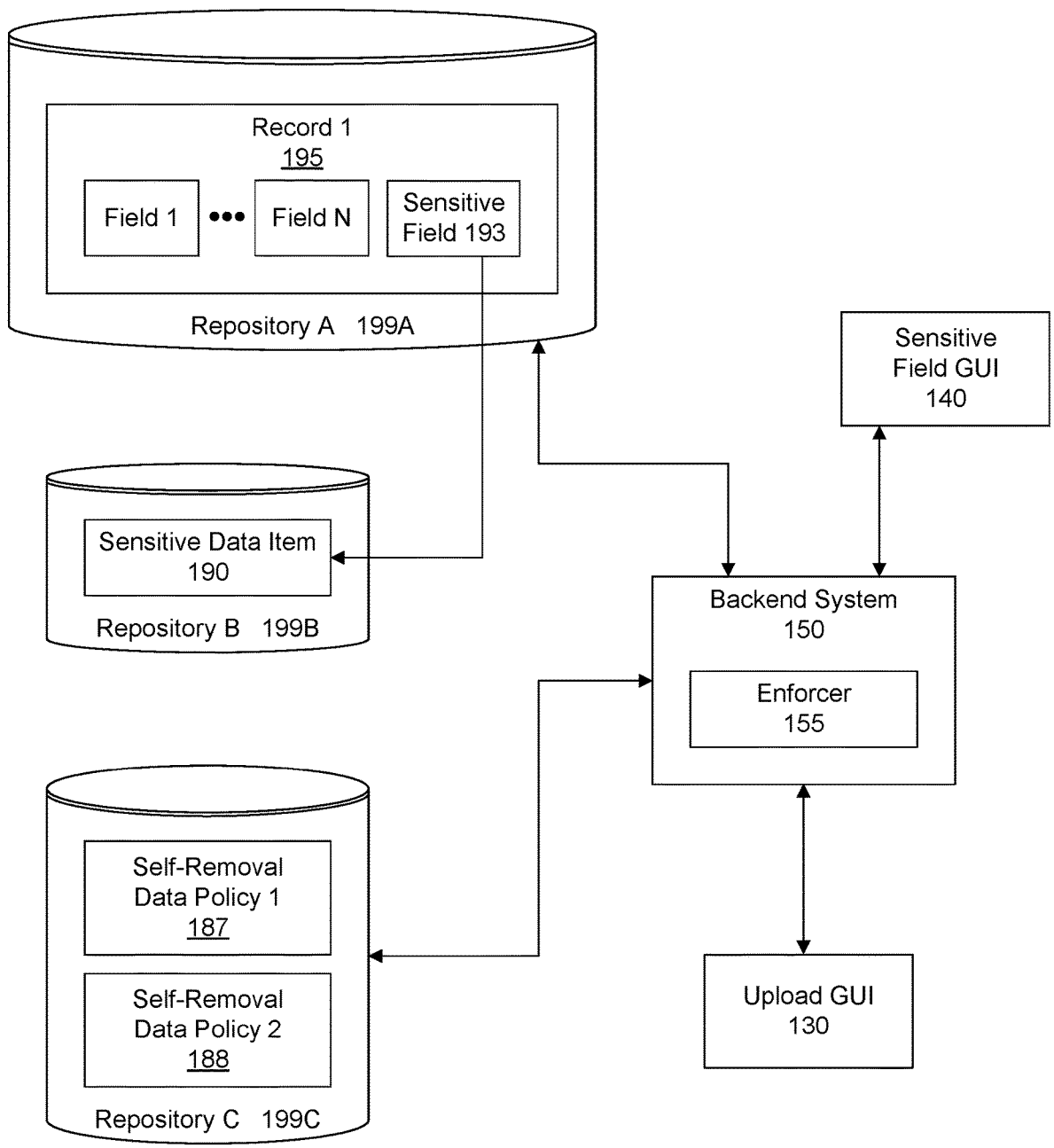
FIG. 1 shows a system for automatic removal of sensitive data items in accordance with one or more embodiments.

FIG. 1 shows a system for automatic removal of sensitive data items in accordance with one or more embodiments. As shown in FIG. 1, the system includes one or more repositories (e.g., repository A 199A, repository B 199B, repository C 199C). Any of the repositories may be multi-tenant database systems. FIG. 1 also has a backend system 150. The backend system 150 may be implemented in any combination of hardware and software. Backend system 150 may execute on a computing device (e.g., server, mainframe, desktop personal computer (PC), laptop, smart phone, tablet PC, etc.) that is connected to repository A 199A, repository B 199B, and repository C 199C via one or networks of any size (e.g., the Internet) having wired and/or wireless segments.

Repository A 199A stores multiple records including record 1 195. As shown in FIG. 1, record 1 195 is of a record type having multiple fields including sensitive field 193. Sensitive field 193 may be populated based on a sensitive data item belonging to and/or uploaded by a user (e.g., financial data, medical data, etc.). If the sensitive data item is a string or numerical value (e.g., social security number, credit card number, password, salary, etc.), it may be stored directly in sensitive field 193. If the sensitive data item takes on some other format (e.g., a file such as a document, an image, a spreadsheet, a slideshow, a video and/or audio clip, etc.), the sensitive data item may be stored separately from record 1 195, and the sensitive field 193 may be populated with a pointer to the separately stored sensitive data item. For example, in FIG. 1, sensitive data item 190 is stored in repository B 199B. The sensitive field 193 stores a pointer to the sensitive data item 190. The other fields in record 1 195 (e.g., field 1, . . . , field N) may store "regular" or "non-sensitive" data items.

Although record 1 195 is shown as only having one sensitive field, in other embodiments, record 1 195 may have any number of sensitive fields. Further, although FIG. 1 shows record 1 195 and sensitive data item 190 being stored in different repositories, in other embodiments, record 1 195 and sensitive data item 190 may be stored in the same repository.

In one or more embodiments, repository C 199C stores one or more self-removal data policies (e.g., self-removal data policy 1 187, self-removal data policy 2 188). A self-removal data policy may be generated by any entity and at any time including before or after record 1 195 is generated. Each self-removal data policy may include a condition set (i.e., one or more conditions) that controls when a sensitive data item is to be deleted. Some conditions may be based on time periods following the upload and/or storage of the sensitive data items. Some conditions may be based on the occurrences of events that require the sensitive data items. Some conditions may be based on reads or approvals of the sensitive data items. These conditions are discussed below in reference to FIG. 2.

In one or more embodiments, each sensitive field (e.g., sensitive field 193) is linked to one of the self-removal data policies (e.g., self-removal data policy 187, self-removal data policy 188). The condition set in the linked self-removal data policy controls when the sensitive data item should be removed (e.g., deleted) from the corresponding record (e.g., controls when sensitive data item 190 should be removed from record 1 195). In one or more embodiments, the removal process does not delete the entire record and also does not remove data items from other fields. Each record may have a pointer to the linked self-removal data policy. Additionally or alternatively, each record may store at least a portion of the linked self-removal data policy (e.g., the condition set of the linked self-removal data policy) in fields or metadata of the record.

In one or more embodiments, backend system 150 is configured to cause one or more graphical user interfaces (GUIs) (e.g., upload GUI 130, sensitive field GUI 140) to be displayed on computing devices (e.g., severs, mainframes, desktop PCs, laptops, tablet PCs, smart phones, etc.).

In one or more embodiments, sensitive field GUI 140 includes one or more GUI components (e.g., textboxes, dropdown lists, checkboxes, radio buttons, buttons, etc.) that enable an entity to define the sensitive field(s) of a record type (e.g., sensitive field 193) and to link one of the self-removal data policies to the sensitive field. Sensitive field GUI 140 is further discussed below in reference to FIG. 3.

In one or more embodiments, upload GUI 130 includes one or more GUI components for collecting a sensitive data item from a user (e.g., sensitive data item 190). Upload GUI 130 may be displayed to user in response to the user accessing a webpage of an entity (e.g., airline, concert ticket seller, apartment complex, potential employer, background checking service, etc.). Upload GUI may also include GUI components for collecting data items to populate other fields of a record (e.g., field 1 and field N in record 1 195). A record (e.g., record 1 195) may be generated and stored in response to the user visiting the webpage and providing the data item(s) and sensitive data item(s) via upload GUI 130.

In one or more embodiments, upload GUI 130 may display selectable options to the user. These selectable options enable the user to modify the condition set associated with the sensitive field of the record. Specifically, in response to selecting an option, a modification request is issued by the upload GUI 130 and sent to the backend system. Modification requests are further discussed below in reference to FIG. 2. Moreover, upload GUI 130 is further discussed below in reference to FIG. 4.

In one or more embodiments, backend system 150 includes an enforcer 155. Enforcer 155 is configured to determine if the condition set for a sensitive data item associated with a record is true, and then delete the sensitive data item from the record without deleting the entire record and without deleting other data items from other fields within the record. The operation of the enforcer is further discussed below in reference to FIG. 2.

Figure 2:
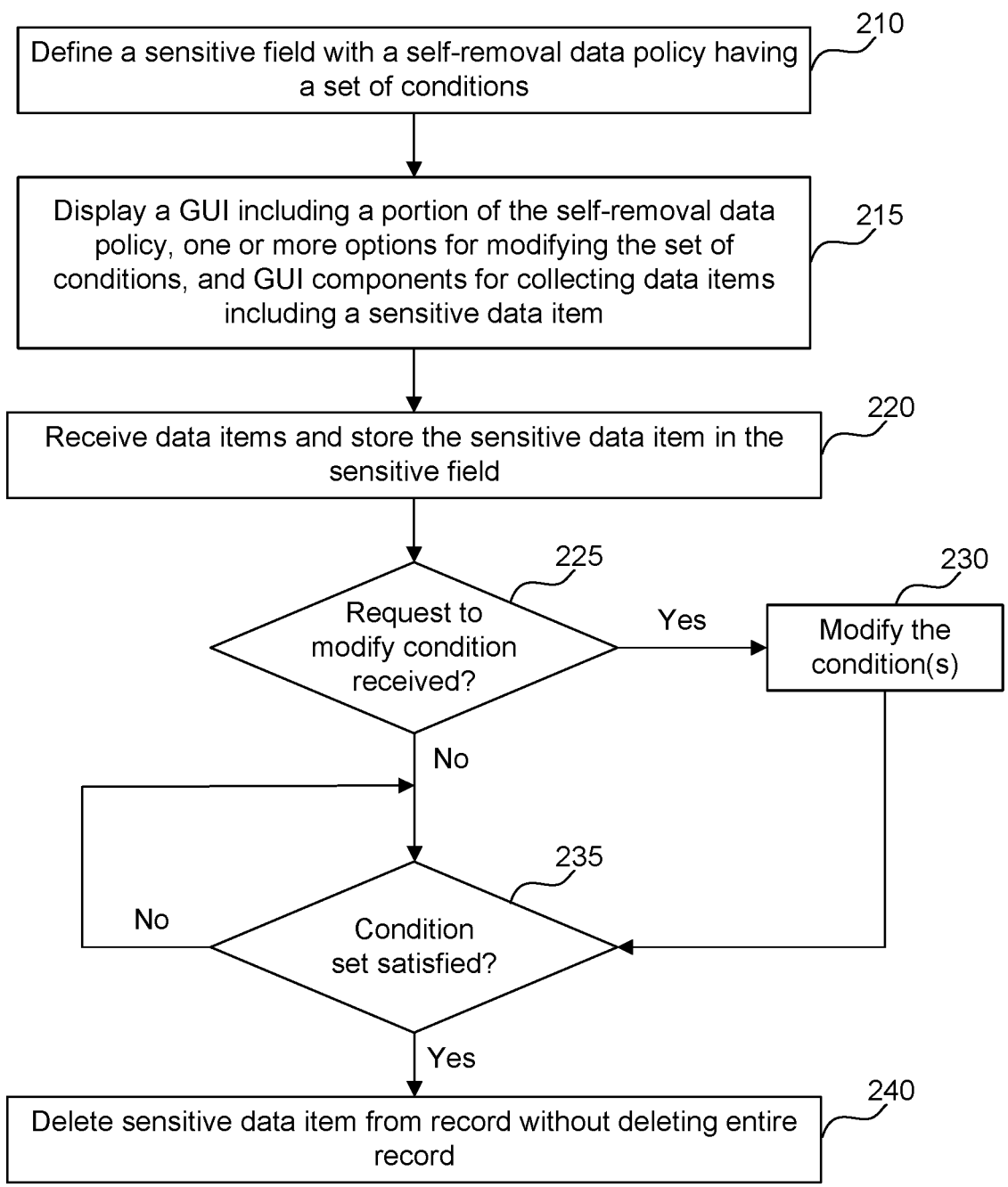
FIG. 2 shows a flowchart for automatic removal of sensitive data items in accordance with one or more embodiments.

FIG. 2 shows a flowchart for automatic removal of sensitive data items from records in accordance with one or more embodiments. The steps in FIG. 2 may be implemented/executed by one or more of the components (e.g., upload GUI 130, backend system 150, enforcer 155) discussed above in reference to FIG. 1. In one or more embodiments, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2. The steps shown in FIG. 2 may be implemented as computer-readable instructions stored on computer-readable media, where, when the instructions are executed, cause a processor to perform the process of FIG. 2.

At 210, a sensitive field is defined for a record type. As discussed above, a sensitive field is a field that will be populated based on a sensitive data item. Specifically, the sensitive field may directly store the sensitive data item or the sensitive field may store a pointer to the sensitive data item. The record type may have one or more sensitive fields. Additionally, the record type may have one or more "regular" or "non-sensitive" fields that will be populated with "regular" or "non-sensitive" data items. The sensitive field my defined using a GUI (e.g., sensitive field GUI 140).

In one or more embodiments, defining a sensitive field includes specifying a label for the sensitive field that will be displayed (e.g., within upload GUI 130) when a user is uploading a sensitive data item, a description of the sensitive field, the type of the sensitive data item (e.g., file, integer, string, etc.) that will be associated with the sensitive field, the ownership of the sensitive data item (e.g., user retains ownership vs. user surrenders ownership, etc.) that will be associate with the sensitive field, and a data sensitivity level (e.g., confidential, top secret, etc.) for the sensitive data item associated with the sensitive field.

In one or more embodiments, defining a sensitive field may include specifying a self-removal data policy for the sensitive field. The self-removal data policy includes a set of conditions (i.e., one or more conditions) that, when satisfied (e.g., the condition set is true), automatically trigger the deletion of the sensitive data item from the record, without deleting the entire record and/or without deleting other data items from other fields in the record.

For example, one condition may specify a time period (e.g., 10 days) following upload and/or storage of the sensitive data item. Once the time period has passed, the sensitive data item is to be deleted. As another example, one condition may specify a one-time-only read or an approval. Once the sensitive data item has been read (e.g., via an access request or read request) or approved by a specify party or entity that utilizes the sensitive date item (e.g., an airline, a financial institution, an academic institution, a background check service, a credit check service, an apartment leasing company, etc.), the sensitive data item is to be deleted. As yet another example, one condition may specify an event (e.g., a flight departure, a concert, a conference, a sporting event, processing of an apartment lease application, approval/denial of a loan application, processing of a job application, etc.) that requires the sensitive data item before the occurrence of the event. Once that event has occurred (e.g., event has started, event has finished, etc.), the sensitive data item is to be deleted.

In one or more embodiments, the self-removal data policy including the condition set is stored in records of the record type. Additionally or alternatively, the self-removal data policy may be stored remotely (e.g., in a different repository than the records of the record type) and the records may include a pointer to the self-removal data policy. Multiple sensitive fields spread across multiple records of the record type may utilize the same self-removal data policy. These multiple records may all have pointers to the self-removal data policy. In one or more embodiments, the self-removal data policy may be generated and stored before the sensitive field is defined. In such embodiments, defining the sensitive field includes selecting one of the existing self-removal data policies.

In one or more embodiments, the entity that generates the self-removal data policy, the entity that defines the sensitive field of the record type, and the entity that eventually utilizes the sensitive data item(s) stored in the sensitive field may be the same entity or different entities.

At 215, a GUI (e.g., upload GUI 130) associated with a record of the record type is displayed. In one or more embodiments, backend system 150 causes the GUI to be displayed. The GUI may be configured to collect data items for one or more fields of the record. The GUI may be displayed on a webpage and/or as part of a smartphone application. For example, the GUI may be displayed in response to the user accessing the webpage or executing the smartphone application. The GUI may include a GUI component (e.g., textbox, drop-down list, radio buttons, button, check boxes, etc.) for collecting the sensitive data item(s) from the user. The GUI may also include additional GUI components for collecting data items for other fields (e.g., "non-sensitive" fields) of the record. The GUI may have multiple screens with different GUI components for collecting data items being located on different screens.

In one or more embodiments, the GUI includes at least a portion of the self-removal data policy. For example, the GUI may display one or more of the conditions specified in the self-removal data policy. This portion of the self-removal data policy may be displayed proximate to the GUI component(s) for collecting the sensitive data item.

In one or more embodiments, the GUI includes options for modifying one or more conditions in the self-removal data policy. The options may enable the user to make a condition more stringent/restrictive or less stringent/restrictive for the sensitive field associated with the record. Some options may be customizable by the user. The user may select/customize these options by manipulating one or more GUI components (e.g., checkboxes, radio buttons, etc.). In response to these manipulations, modification requests are issued by the GUI. A modification request that makes a condition more stringent/restrictive may be referred to as a restriction request. A modification request that makes a condition less stringent/restrict may be referred to as a relax request.

As discussed above, one example of a condition is a time period (e.g., 10 days) that starts with the upload and/or storage of the sensitive data item. The sensitive data item is to be deleted at the end of the time period. One of the options may shorten the time period (e.g., 8 days, 5 days, or a user customizable time period, etc.). A restriction request is issued by the GUI in response to the selection of this option and the restriction request may include the new shorter time period. Additionally or alternatively, one of the options may lengthen the time period and/or grant another entity (e.g., the entity that will utilize the sensitive data item) permission to lengthen the time period up to a limit (e.g., 25 days). A relax request is issued by the GUI in response to the selection of this option and the relax request may include the new time period or available limit.

As also discussed above, one example of a condition is a one-time-only read of the sensitive data item. Once the sensitive data item is read from the record (e.g., via a read request), the sensitive data item is to be deleted. One of the options may increase the number of reads to 3, effectively making the condition less stringent. A relax request is issued by the GUI in response to the selection of this option and the relax request may include the increased number of reads.

At 220, the data items including the sensitive data item are received from the GUI via the GUI components. For example, the data items including the sensitive data item may be received by backend system 150. A record of the record type may be initialized, and the fields of the record may be populated based on the received data items. In one or more embodiments, the sensitive field of the record is populated directly with the sensitive data item. In one or more embodiments, the sensitive data item is stored separately from the record, and the sensitive field is populated with a pointer to the sensitive data item. For example, if the sensitive data item is a file, the file may be stored separately from the record. As shown in FIG. 1, the record and the sensitive date item (e.g., file) may be stored in different repositories (e.g., repository A 199A, repository B 199B).

At 225, it is determined whether a request to modify a condition has been received by, for example, backend system 150. As discussed above, both restriction requests and relax requests are examples of modification requests. When it is determined that no modification requests have been received, the process may proceed to 235. When it is determined that one or more modification requests have been received, the process proceeds to 230.

At 230, one or more conditions in the self-removal data policy for the sensitive field in the record are modified based on the one or more received modification requests. As discussed above, this may include modifying the one or more conditions to be more stringent or less stringent, as requested by the user who uploaded and owns the sensitive data item. If the record stores the conditions directly (e.g., in fields or metadata of record), implementing the modification requests may include modifying the conditions stored in the fields or metadata of the record. If the conditions associated with the sensitive field of the record are stored separately from the record, implementing the modification requests may include modifying this external data.

At 235 it is determined whether the condition set (i.e., one or more conditions) associated with the sensitive field of the record is satisfied (e.g., the condition set is true). This determination may be executed by enforcer 155, discussed above in reference to FIG. 1. For example, if one condition is associated with a time period (discussed above), enforcer 155 may compare the upload or storage date of the sensitive data item with the current date to determine if the time period has elapsed. As another example, if one condition is the occurrence of an event (e.g., flight departure, discussed above), enforcer 155 may access additional resources (e.g., online services) to determine whether the event has occurred. As yet another example, if one condition is one-time-only read, enforcer 155 may access read/write logs to determine if the sensitive field has been read.

At 240, it has been determined that the condition set is satisfied, and the sensitive data item is deleted from the record. If the record is directly storing the sensitive data item, this may include deleting the sensitive data item from the sensitive field. If the sensitive data item and the record are stored separately, this may include deleting the sensitive data item (from its separate location) and/or deleting a pointer in the sensitive field of the record to the sensitive data item.

Those skilled in the art, having the benefit of this detailed description, will appreciate that when two records of the same record type are initialized, they may have the same self-removal data policy and thus the same condition set for a sensitive field. However, if different users are populating the two records, these different users may modify conditions (e.g., make conditions more or less stringent) differently for their respective records, and thus the two records may end up with different condition sets.

Figure 3:
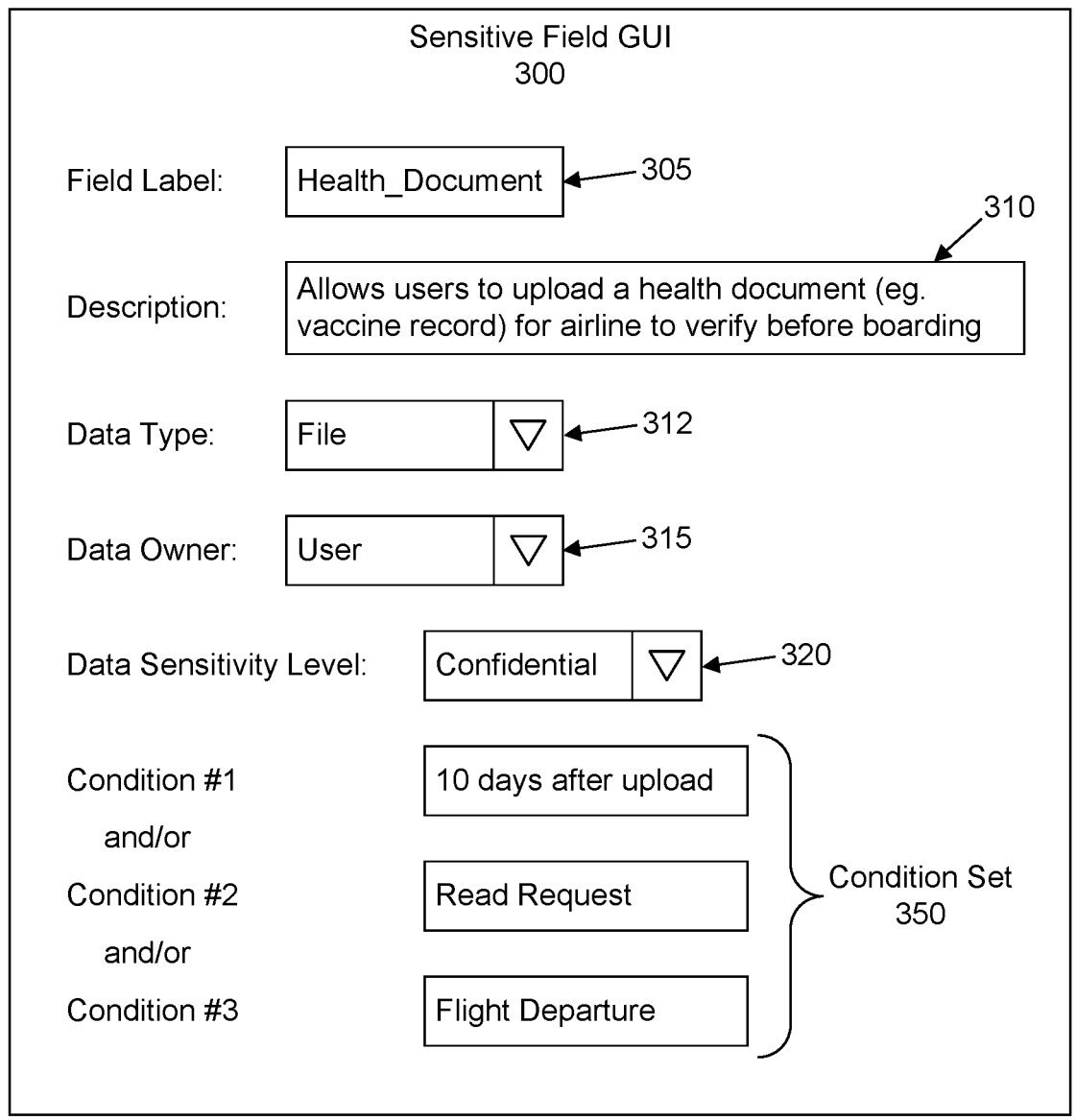
FIG. 3 shows an example sensitive field GUI in accordance with one or more embodiments.

FIG. 3 shows an example of a sensitive field GUI 300 in accordance with one or more embodiments. Sensitive field GUI 300 may correspond to sensitive field GUI 140, discussed above in reference to FIG. 1. Sensitive field GUI 300 may be used by an entity to define a sensitive field for a record type, and thus may be used to implement step 210, discussed above in reference to FIG. 1. In this example, the record type pertains to an airline, and the sensitive data item is a health document (e.g., vaccine record) of a passenger who is ticketed for a flight.

As shown in FIG. 3, sensitive field GUI 300 has multiple GUI components (e.g., textboxes, dropdown lists, etc.). There is a textbox 305 for inputting the label of the sensitive field (e.g., the label will be visible to the passenger uploading the health document). There is a textbox 310 for inputting a description of the sensitive field. There is a dropdown list 312 for selecting the type of sensitive data item (e.g., file, string, numerical value, etc.) associated with the sensitive field that will be uploaded by the passenger. There are also dropdown lists 315 and 320 for specifying who retains ownership of the sensitive data item (e.g., passenger vs. airline) once it is uploaded and the sensitivity level of the sensitive data item, respectively.

In one or more embodiments, sensitive field GUI 300 also includes GUI components for specifying a condition set 350

(i.e., one or more conditions) of a self-removal data policy. The entity defining the sensitive field may manipulate these GUI components to specify the condition set 350. In one or more embodiments, the entity may select an existing self-removal data policy (e.g., from repository C 199C). In such embodiment, these GUI component may be automatically populated in response to the selection of an existing self-removal data policy. The condition set 305 may also be customized.

In the example of FIG. 3, there are three conditions. One condition requires the sensitive data item (e.g., passenger health document) associated with the sensitive field be deleted 10 days after it is uploaded by the passenger. One condition requires the sensitive data item (e.g., passenger health document) be deleted following a read request from an airline agent. This condition allows for a one-time-only read of the passenger health document. One condition requires the sensitive data item (e.g., passenger health document) to be deleted when an event occurs (e.g., flight for which the passenger is ticketed departs). In one or more embodiments, the sensitive data item (e.g., passenger health document) may be deleted when at least one of the conditions in the condition set 350 is true. In such embodiments, the conditions are linked by an "OR", which is part of the condition set. In one or more embodiments, the sensitive data item (e.g., passenger health document) may be deleted when all of the conditions in the condition set 350 are true. In such embodiments, the conditions are linked by an "AND," which is part of the condition set.

Although not explicitly shown in FIG. 3, sensitive field GUI 300 may also include GUI components for specifying that the condition set 350 makes the sensitive field or record type complaint with one or more known security/privacy standards or protocols.

Those skilled in the art, having the benefit of this detailed description, will appreciate that a record type may have multiple fields including the sensitive field. While sensitive field GUI 300 is used to define the sensitive field for the record type, other GUIs (not shown) may be used to define the other fields for the record type.

Figure 4:
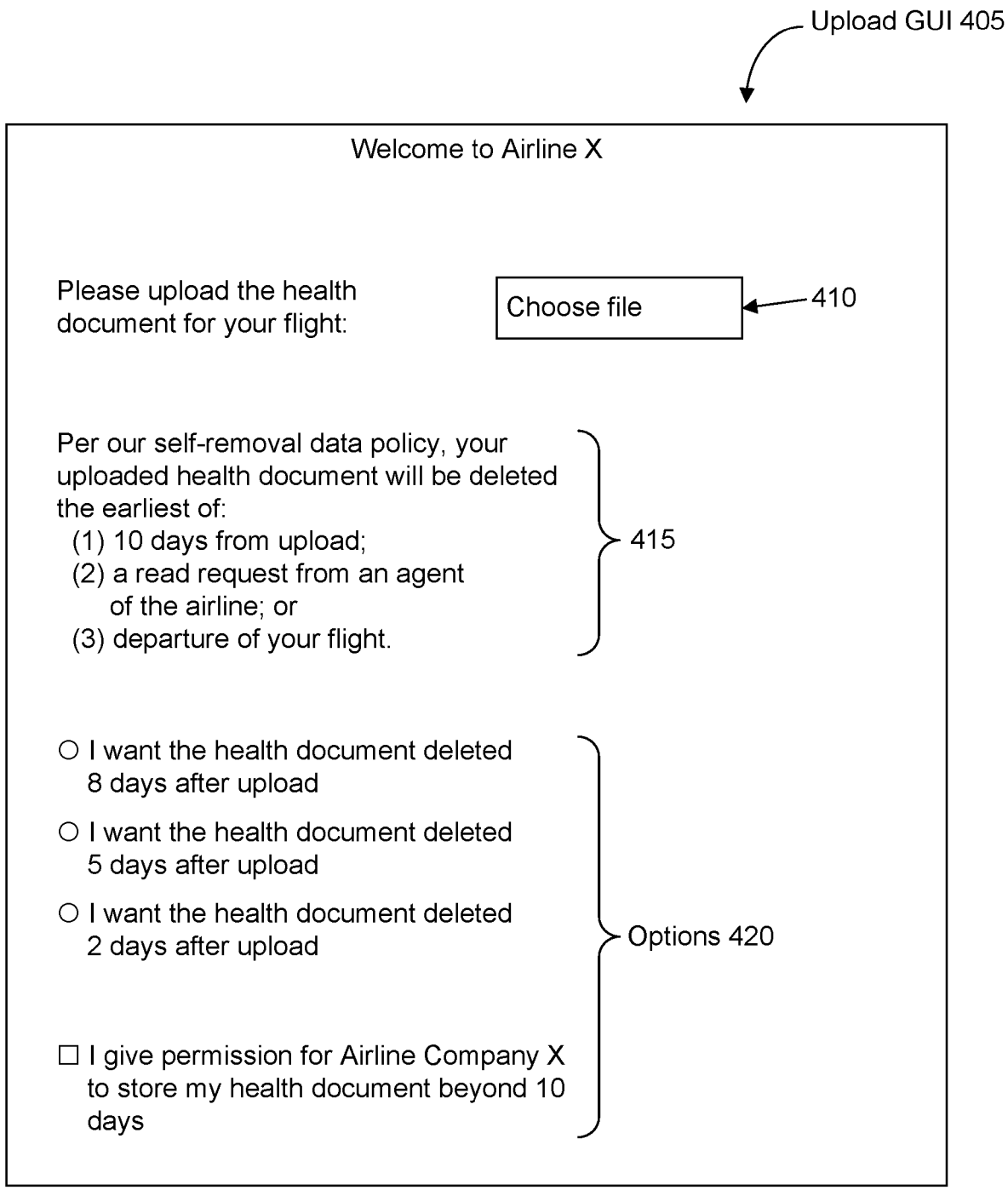
FIG. 4 shows an example upload GUI in accordance with one or more embodiments.

FIG. 4 shows an example of an upload GUI 405 in accordance with one or more embodiments. Upload GUI 405 may correspond to upload GUI 130, discussed above in reference to FIG. 1. Upload GUI 405 may be displayed to a user and used to collect a sensitive data item from the user. In this example, upload GUI 405 may be displayed on the webpage of an airline to an existing or potential ticketed passenger of the airline. Moreover, the upload GUI 405 is generated based on the sensitive field GUI 300, discussed above in reference to FIG. 3. Accordingly, the sensitive data item may be a health document (e.g., vaccine record) of the passenger.

As shown in FIG. 4, the upload GUI 405 includes a button 410. In response to selecting button 410, the user (e.g., passenger) is able to select the health document (e.g., from a local machine or network) for upload. Once uploaded, this health document (e.g., a file) may be stored in the sensitive field of a record. Additionally or alternatively, the uploaded health document may be stored separately from the record, and the record may store a pointer in the sensitive field referencing the health document.

As discussed above, the sensitive field is associated with a self-removal data policy that includes a condition set. As also shown in FIG. 4, at least a portion of the self-removal data policy 415 is displayed on the upload GUI 405. For example, the condition set of the self-removal data policy may be displayed on the upload GUI 405. As shown, one of the conditions is automatic deletion of the uploaded health document within a time period of 10 days.

In one or more embodiments, the upload GUI 405 also displays one or more options. The user (e.g., passenger) is able to modify one or more of the conditions associated with the uploaded sensitive data item (e.g., health document) by selecting one of the options. The first three options shorten the time period (e.g., 8 days<10 days, 5 days<10 days, 2 days<10 days). Although not shown, one of the options may permit the user (e.g., passenger) to provide a custom time period by explicitly inputting the number of days. In response to selecting one of these options, a restriction request including the shorter time period is issued (e.g., by the upload GUI 405 to the backend system 150). The record associated with the uploaded health document will be updated by backend system 150 to reflect the original condition (e.g., automatic deletion in 10 days) has been made more stringent (e.g., automatic deletion in 5 days instead of the original 10 days). The sensitive data item will be removed from the record (without deleting the entire record) according to the condition set now having this more stringent condition.

In one or more embodiments, one of the options displayed within the upload GUI 405, if selected, may render a condition of the condition set less stringent. For example, the final option displayed in the upload GUI 405 grants the airline permission to store the uploaded sensitive data item (e.g., health document) for a time period that is longer than 10 days (e.g., increase the number of days from 10 to a higher number). Although not shown, the user may be able to explicitly input the new and longer time period or time limit. In response to selecting this option, a relax request is issued (e.g., by the upload GUI 405 to the backend system 150). The record associated with the uploaded health document will be updated by the backend system 150 to reflect the original condition (e.g., automatic deletion in 10 days) has been made less stringent (e.g., storage beyond 10 days is permissible). The sensitive data item will be removed from the record (without deleting the entire record) according to the condition set now having this less stringent condition.

Figure 5:
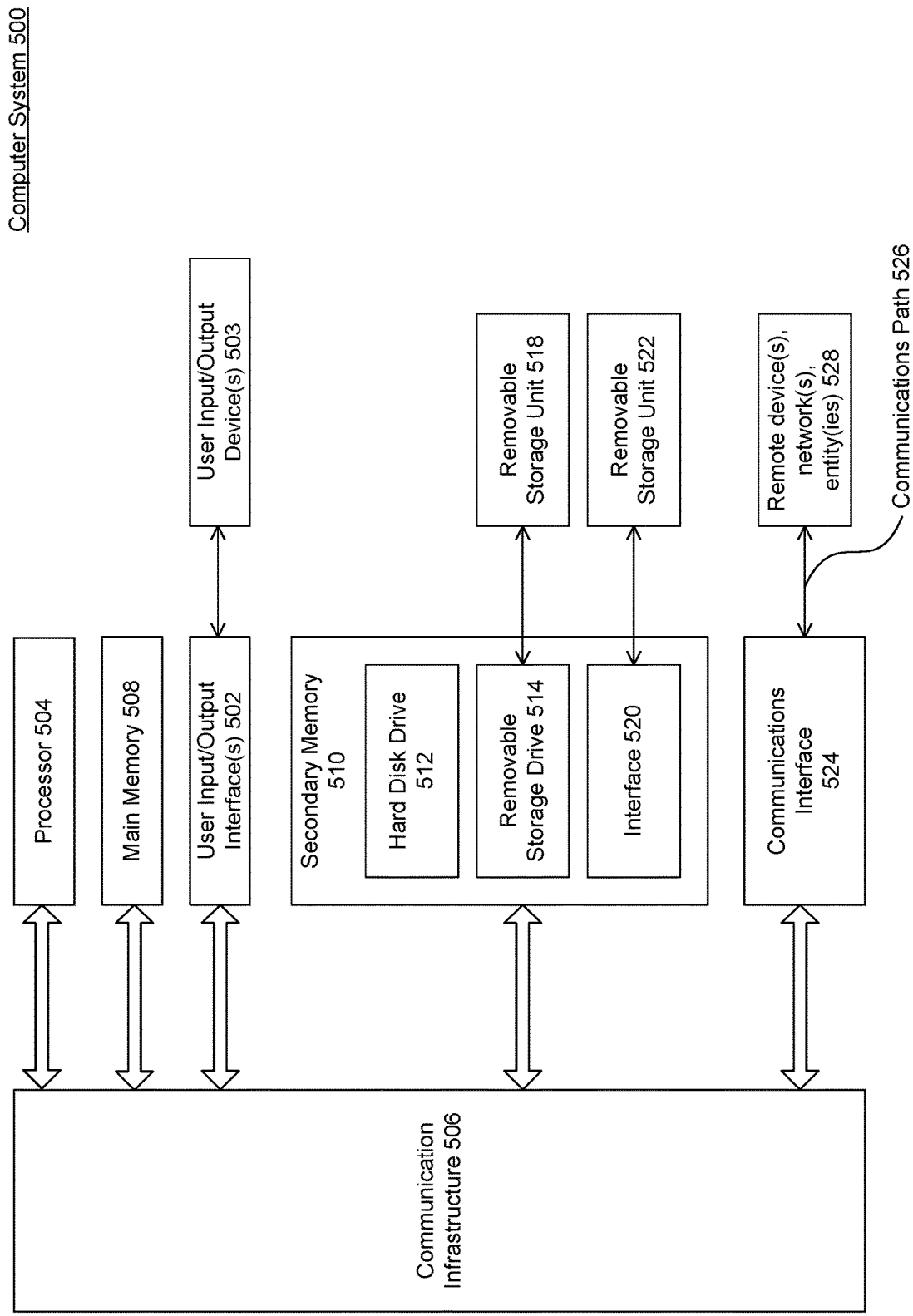
FIG. 5 shows a computer system in accordance with one or more embodiments.

Various embodiments can be implemented, for example, using one or more computer systems, such as computer system 500 shown in FIG. 5. Computer system 500 can be used, for example, to implement the processes shown in FIG. 2. Computer system 500 can also be used to implement the GUIs shown in FIGS. 3 and 4. Computer system 500 can be any computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
    causing display of a graphical user interface (GUI) comprising:
        a GUI component for collecting a sensitive data item provided by a user; and
        a portion of a self-removal data policy associated with the sensitive data item, wherein the portion of the self-removal data policy comprises a set of conditions including first and second conditions that cause the sensitive data item to be removed when either of the first and second conditions is satisfied;
    receiving, via the GUI, the sensitive data item provided by the user and a request provided by the user to update one or more of the first and second conditions for the sensitive data item in the set of conditions;
    storing a record comprising a plurality of fields including a sensitive field populated based on the sensitive data item, wherein the sensitive data item in the sensitive field is associated with the updated set of conditions; and
    in response to determining, based on satisfaction of the first condition on removing the sensitive data item and satisfaction of the second condition on removing the sensitive data item, whether a combination linking the first and second conditions in the updated set of conditions in the self-removal data policy is satisfied, deleting the sensitive data item in the sensitive field of the record.

2. The method of claim 1, further comprising:
    receiving an indication from the user specifying an entity retaining an ownership of the sensitive data item in the stored record;

receiving an indication from the user specifying a sensitivity level of the sensitive data item; and storing the sensitive data item in a first repository, wherein the record is stored in a second repository, wherein the sensitive field of the record comprises a pointer to the sensitive data item stored in the first repository, and wherein deleting the sensitive data item from the sensitive field comprises deleting the pointer from the sensitive field.

3. The method of claim 2, wherein the sensitive data item is a file comprising medical and financial data uploaded by the user and wherein the combination comprises an "OR" operation to delete the sensitive data item when either of the first and second conditions is satisfied.

4. The method of claim 1, further comprising:

receiving, via the GUI, a restriction request from the user to make a condition of the set of conditions more stringent, wherein the user generates the restriction request by selecting an option from a plurality of options displayed within the GUI.

5. The method of claim 4, wherein the condition is a time period following storage of the sensitive data item, wherein the plurality of options are shorter time periods, and wherein the restriction request specifies the option selected by the user.

6. The method of claim 1, further comprising:

receiving, via the GUI, a relax request from the user to make a condition of the set of conditions less stringent, wherein the user generates the relax request by selecting an option from a plurality of options displayed within the GUI.

7. The method of claim 1, wherein the set of conditions comprises a one-time-only read for the sensitive data item.

8. The method of claim 1, wherein the set of conditions comprises occurrence of an event that requires the sensitive data item prior to occurrence of the event and wherein the sensitive data item is deleted upon occurrence of the event.

9. A system, comprising:

a memory; and at least one processor coupled to the memory and configured to:

cause display of a graphical user interface (GUI) comprising:

a GUI component for collecting a sensitive data item provided by a user; and a portion of a self-removal data policy associated with the sensitive data item, wherein the portion of the self-removal data policy comprises a set of conditions including first and second conditions that cause the sensitive data item to be removed when either of the first and second conditions is satisfied;

receiving, via the GUI, the sensitive data item provided by the user and a request provided by the user to update one or more of the first and second conditions for the sensitive data item in the set of conditions;

storing a record comprising a plurality of fields including a sensitive field populated based on the sensitive data item, wherein the sensitive data item in the sensitive field is associated with the updated set of conditions; and in response to determining, based on satisfaction of the first condition on removing the sensitive data item and satisfaction of the second condition on removing the sensitive data item, whether a combination linking the first and second conditions in the updated set of conditions in the self-removal data policy is satisfied, deleting the sensitive data item in the sensitive field of the record.

10. The system of claim 9, wherein the at least one processor is further configured to:

receive an indication from the user specifying an entity retaining an ownership of the sensitive data item in the stored record;

receive an indication from the user specifying a sensitivity level of the sensitive data item and store the sensitive data item in a first repository, wherein the record is stored in a second repository, wherein the sensitive field of the record comprises a pointer to the sensitive data item stored in the first repository, and wherein deleting the sensitive data item from the sensitive field comprises deleting the pointer from the sensitive field.

11. The system of claim 9, wherein the at least one processor is further configured to:

receive, via the GUI, a restriction request from the user to make a condition of the set of conditions more stringent, wherein the user generates the restriction request by selecting an option from a plurality of options displayed within the GUI.

12. The system of claim 11, wherein the condition is a time period following storage of the sensitive data item, wherein the plurality of options are shorter time periods, and wherein the restriction request specifies the option selected by the user.

13. The system of claim 9, wherein the at least one processor is further configured to:

receive, via the GUI, a relax request from the user to make a condition of the set of conditions less stringent, wherein the user generates the relax request by selecting an option from a plurality of options displayed within the GUI.

14. The system of claim 9, wherein the set of conditions comprises a one-time-only read for the sensitive data item.

15. The system of claim 9, wherein the set of conditions comprises occurrence of an event that requires the sensitive data item prior to occurrence of the event and wherein the sensitive data item is deleted upon occurrence of the event.

16. A non-transitory computer readable medium (CRM) having instructions stored thereon, the instructions, when executed by at least one computing device, cause the at least one computing device to perform operations comprising:

causing display of a graphical user interface (GUI) comprising:

a GUI component for collecting a sensitive data item provided by a user; and a portion of a self-removal data policy associated with the sensitive data item, wherein the portion of the self-removal data policy comprises a set of conditions including first and second conditions that cause the sensitive data item to be removed when either of the first and second conditions is satisfied;

receiving, via the GUI, the sensitive data item provided by the user and a request provided by the user to update one or more of the first and second conditions for the sensitive data item in the set of conditions;

storing a record comprising a plurality of fields including a sensitive field populated based on the sensitive data item, wherein the sensitive data item in the sensitive field is associated with the updated set of conditions; and in response to determining, based on satisfaction of the first condition on removing the sensitive data item and satisfaction of the second condition on removing the sensitive data item, whether a combination linking the first and second conditions in the updated set of conditions in the self-removal data policy is satisfied, deleting the sensitive data item in the sensitive field of the record.

17. The non-transitory CRM of claim 16, the operations further comprising:

receiving an indication from the user specifying an entity retaining an ownership of the sensitive data item in the stored record;

receiving an indication from the user specifying a sensitivity level of the sensitive data item; and receiving, via the GUI, a restriction request from the user to make a condition of the set of conditions more stringent, wherein the user generates the restriction request by selecting an option from a plurality of options displayed within the GUI, wherein the condition is a time period following storage of the sensitive data item, wherein the plurality of options are shorter time periods, and wherein the restriction request specifies the option selected by the user.

18. The non-transitory CRM of claim 16, the operations further comprising:

receiving, via the GUI, a relax request from the user to make a condition of the set of conditions less stringent, wherein the user generates the relax request by selecting an option from a plurality of options displayed within the GUI.

19. The non-transitory CRM of claim 16, wherein the set of conditions comprises a one-time-only read for the sensitive data item.

20. The non-transitory CRM of claim 16, wherein the set of conditions comprises occurrence of an event that requires the sensitive data item prior to occurrence of the event and wherein the sensitive data item is deleted upon occurrence of the event.

\* \* \* \* \*